3,431,168
REACTOR COOLING SYSTEM
Jens E. Kjemtrup, Los Gatos, Calif., assignor to General Electric Company, a corporation of New York
Filed June 26, 1967, Ser. No. 648,751
U.S. Cl. 176—55
Int. Cl. G21c 15/00; F22b 1/00
5 Claims

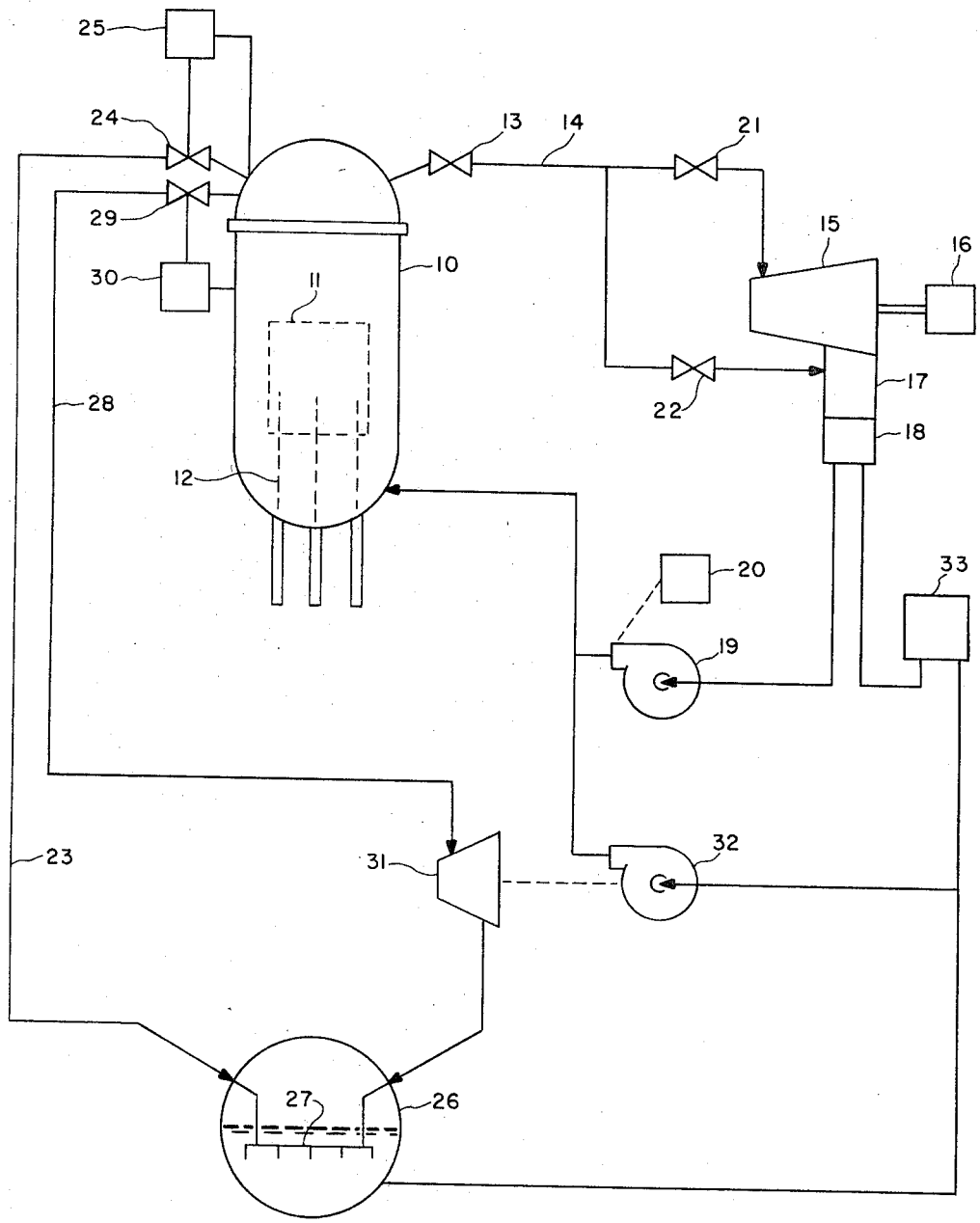

ABSTRACT OF THE DISCLOSURE

This describes an auxiliary cooling system for removing decay heat from a nuclear reactor and for maintaining the coolant level in the reactor vessel in the event that the normal circulation system must be closed. A pressure relief valve allows decay steam to escape into a body or pool of coolant. A portion of the escaping steam is applied to a turbine which drives a pump for supplying coolant from a storage tank to the reactor vessel to maintain the coolant level. The system thus remains operable even in the event of loss of normal and auxiliary A-C electrical power.

---

Nuclear reactors are now well-known and are in use in power plants for conversion of the heat of the fission process to electrical power. Such power plants are described, for example, by R. L. Loftness in Nuclear Power Plants, D. Van Nostrand Company Inc., Princeton, N.J., 1964. For example, in one type of power plant the nuclear reactor comprises an array or core of nuclear fuel rods in a pressure vessel. A working fluid or coolant such as water is circulated past the fuel rods by which steam under pressure is produced. The steam is applied to a turbine-generator to produce electrical power. The exhaust steam is passed through a condenser and the resulting condensate is collected in a reservoir from which it is returned as feed water to the reactor vessel by means of feed-water pumps.

Control rods containing neutron absorbent or poison material are selectively insertable into the core to control the thermal energy release rate or power level. The control rod arrangement is such that when all control rods are inserted in the core the reactivity is reduced to below the critical level and the reactor is "shut down." Insertion of the control rods will not halt the production of steam immediately. Steam production will continue for some time from the after-heat due to delayed neutrons, heat stored in the nuclear fuel and from radioactive decay of fission products. The after-steam thus produced cannot simply be vented to the atmosphere because of the possibility that it may contain products harmful to animal and plant life. In a normal plant shut-down the after-steam is accommodated by applying it to the main condenser via a turbine-generator bypass valve and the normal feed water system maintains the coolant level in the reactor vessel.

Under certain abnormal conditions the main condenser will not be available to take care of the after-steam. For example, failure of the main condenser or loss of all A-C electrical power causes closure of the main steam line isolation valves. Considerations of safety thus dictate that an auxiliary system be provided. In prior plants this auxiliary system is formed of one or more large and expensive auxiliary steam condensers and condensate tanks, located above the reactor vessel to provide gravity circulation of the primary steam returning to the reactor pressure vessel as condensate to maintain the fluid in the vessel at a level above the reactor core.

The object of this invention is to remove decay heat from a nuclear reactor and maintain coolant level in the reactor vessel without the need of auxiliary steam condensers and without dependence upon A-C electrical power.

This and other objects of the invention are achieved by venting the after-steam into a pool of water (which already may be provided as a component of a pressure suppression system) wherein the steam is condensed. A required portion of the vented steam is applied to a turbine-pump which thereby supplies water from a storage tank to the reactor vessel to maintain the coolant level.

The invention is described more specifically hereinafter with reference to the accompanying drawing wherein the system of the invention is schematically illustrated.

The invention is illustrated herein as used in a power plant employing a direct cycle boiling water reactor. A pressure vessel 10 contains a nuclear fuel core 11. (The pressure vessel 10 is normally housed in a thick-walled containment building, not shown.) A plurality of control rods 12 are reciprocal (by means not shown) into and out of the core 11 to control the reactivity thereof. The vessel 10 is filled with a coolant (for example, light water) to a level somewhat above the core 11. The coolant is circulated through the core 11 by natural circulation or by a forced circulation system (not shown) whereby the heat produced by the core is transferred to the water and a head of steam is produced in the upper portion of the pressure vessel 10. Steam, thus under pressure, is applied via a main steam valve 13 and a main steam line or pipe 14 to a steam turbine 15, the turbine 15 driving an electrical generator 16. The turbine 15 exhausts to a condenser 17 and the resulting condensate is collected in a condenser hotwell 18. During normal operation the condensate is returned as feedwater to the vessel 10 by a feedwater pump 19 driven by an electric motor 20. A storage tank 33 provides makeup water and receives any excess water from hotwell 18.

During a normal plant shut-down the control rods 12 are inserted into core 11 to decrease its reactivity and hence the production of heat. However, as mentioned hereinbefore, the production of steam continues for some period of time because of delayed neutrons, stored heat and radioactive decay of fission products. The after-steam thus produced is normally accommodated by closing a valve 21 to turbine 15 and opening a bypass valve 22 to apply the after-steam directly to condenser 17, the condensate being returned by feedwater pump 19 to maintain the coolant level in the vessel 10 in the normal manner.

There may be occasions when the main condenser 17 is not available to accommodate the after-steam as described above. For example, the condenser 17 may become inoperative or there may be a failure of both primary and auxiliary A-C electrical power in which case the feedwater pump 19 becomes inoperative. In these and other events in which operation of the main system becomes impaired, it is arranged that the main steam valve 13 is automatically closed thus isolating the main steam system from the reactor vessel. As mentioned hereinbefore, the after-steam cannot be vented directly to the atmosphere because of the possibility that it may contain products harmful to animal and plant life. Furthermore, to prevent damage to the nuclear core, it is necessary to maintain the coolant level in vessel 10 so that the core 11 remains submerged.

Thus the auxiliary core cooling system of the invention comes into operation in the event of main system failures which cause the closure of the main steam valve 13. The system of the invention provides two functions: (1) it accommodates the after steam and (2) it provides make-up water to the reactor vessel.

The first function is provided by a first auxiliary steam line 23 which includes a valve 24. The valve 24 is operated by a pressure sensitive unit 25 which is set to open valve 24 at a predetermined pressure above the normal operating pressure in the vessel 10. When the valve 24 is thus opened the after-steam passes through line 23 and exhausts therefrom beneath the surface of a pool of coolant such as water contained in a pressure suppression vessel 26. The line 23 may connect to a horizontal sparger 27 having a plurality of downwardly directed openings for distribution of the after-steam into the pool of water. This arrangement is found to provide effective condensation of the after-steam.

Conveniently and economically, the suppression vessel 26 with its contained pool of water already may be provided in the power plant as a component of a pressure suppression system designed to condense the escaping steam in the unlikely event of a major rupture of the pressure vessel 10 or of the primary lines within the containment building. Such a pressure suppression system, including a suppression pool, is shown and described by C. P. Ashworth et al. in an article entitled, "Pressure Suppression," Nuclear Engineering, August 1962, pp. 313–321. Thus, where such a pressure suppression system is incorporated in the power plant, the suppression pool thereof may serve also as the after-steam condensing pool of the present invention.

The second function of the system of the invention, namely, the maintenance of the coolant level in the reactor vessel 10, is provided by the following structure. A second auxiliary steam line 28 includes a valve 29. The valve 29 is operated by a valve control unit 30 which is responsive to the liquid level of the coolant in the reactor vessel 10. When the level of the liquid coolant drops below a predetermined point the control unit 30 opens the valve 29 to apply steam to a steam operated motor or turbine 31. The exhaust steam from the turbine 31 is condensed in the pool of coolant fluid in suppression vessel 26.

The turbine 31 directly drives a pump 32 which supplies make-up water to the reactor vessel 10 from any suitable coolant reservoir, for example, from the storage tank 33 and/or from the vessel 26.

Thus what has been described is an auxiliary core cooling system for safely removing decay heat from the core of a nuclear reactor and for maintaining the liquid coolant level in the reactor vessel in the event that the normal circulation system becomes inoperative. The system is independent of electrical power with the possible exception of emergency battery power which may be required for operation of pressure and level sensing control units 25 and 30.

While an illustrative embodiment of the invention has been described herein, modifications and adaptations thereof may be made by those skilled in the art without departure from the spirit and scope of the invention as defined by the following claims.

What is claimed is:

1. The combination of: a pressure vessel; a liquid coolant partially filling said vessel; a nuclear reactor core in said vessel submerged in said liquid coolant; selectively operable means for controlling the reactivity of said core for producing heat to vaporize a portion of said coolant to produce a head of pressurized coolant vapor in said vessel; a vapor operated motor; a vapor line for applying pressurized vapor from said vessel to said motor; a valve in said line; valve control means for opening said valve when the liquid coolant level in said vessel falls below a predetermined point; and a pump driven directly by said motor for adding liquid coolant to said vessel.

2. The combination defined by claim 1 further including: vapor condensing means; a second vapor line for directing vapor from said vessel to said means; a valve in said second vapor line; and valve control means for opening said valve in said second vapor line in response to a predetermined pressure in said vessel.

3. The combination defined by claim 2 wherein said predetermined pressure is greater than the normal operating pressure.

4. The combination of: a pressure vessel; a liquid coolant partially filling said vessel; a nuclear reactor core in said vessel submerged in said liquid coolant; selectively operable means for controlling the reactivity of said core for producing heat to vaporize a portion of said coolant to produce a head of pressurized coolant vapor in said vessel; a pool of coolant liquid substantially at atmospheric pressure; a vapor line for exhausting vapor from said vessel to beneath the surface of the liquid coolant in said pool; a valve in said line; pressure responsive valve control means for opening said valve when the pressure in said vessel exceeds a predetermined pressure; and means, including a motor-pump operated by pressurized vapor from said vessel, for maintaining the liquid coolant in said vessel at a predetermined minimum level.

5. The combination of: a pressure vessel; a liquid coolant partially filling said vessel; a nuclear reactor core in said vessel for producing heat to vaporize a portion of said coolant to produce a head of pressurized coolant vapor in said vessel; a motor operated by pressurized vapor; means responsive to a predetermined level of liquid coolant in said vessel for directing coolant vapor from said vessel to said motor; a pump driven by said motor for adding coolant to said vessel; vapor condensing means; and means responsive to pressures above a predetermined pressure in said vessel for venting vapor from said vessel to said condensing means.

References Cited

UNITED STATES PATENTS

| | | | |
|---|---|---|---|
| 3,035,993 | 5/1962 | Treshow | 176—56 X |
| 3,114,414 | 12/1963 | Judd | 122—32 X |
| 3,115,450 | 12/1963 | Schanz | 176—38 X |
| 3,194,020 | 7/1965 | Hanzalek | 122—406 X |

REUBEN EPSTEIN, *Primary Examiner.*

U.S. Cl. X.R.

176—37, 38, 56; 122—32